United States Patent [19]

Shimazaki

[11] Patent Number: 5,702,143
[45] Date of Patent: Dec. 30, 1997

[54] ARRANGEMENT FOR ANCHORING A GUARD NET IN AUTOMOBILE

[75] Inventor: Mitsuo Shimazaki, Akishima, Japan

[73] Assignee: Tachi-S Co., Ltd., Tokyo, Japan

[21] Appl. No.: 616,582

[22] Filed: Mar. 15, 1996

[51] Int. Cl.$^6$ ............................................. B60R 5/04
[52] U.S. Cl. .................. 296/24.1; 296/37.16; 160/24; 160/903
[58] Field of Search ................ 296/24.1, 69, 37.16; 160/24, 370.22, 903

[56] References Cited

U.S. PATENT DOCUMENTS

| | | |
|---|---|---|
| 1,363,746 | 12/1920 | Nossek . |
| 3,891,263 | 6/1975 | Orsulak ............................. 296/24.1 |
| 4,202,577 | 5/1980 | Breitschwerdt et al. ......... 296/37.16 X |
| 5,011,208 | 4/1991 | Lewallen ......................... 296/37.16 |
| 5,288,122 | 2/1994 | Pilhall ............................. 296/24.1 |

FOREIGN PATENT DOCUMENTS 258823  3/1988  European Pat. Off. ............ 296/37.16

*Primary Examiner*—Dennis H. Pedder
*Attorney, Agent, or Firm*—Browdy and Neimark

[57] ABSTRACT

An arrangement for anchoring a partition or guard net to a rear side of seat back of foldable-type automotive seat in which the seat back is foldable onto the seat cushion. The arrangement comprises a reversible anchor engagement member and a storage tray member embedded in the rear side of seat back. The reversible anchor engagement member is rotatably provided for permitting its reversal in the storage tray member so as to select either a working engagement side with which an anchor member of the guard net is to be engaged and anchored, or a non-working flat side generally flush with the rear side of seat back. Thus, when in no use, the anchor engagement member may be reversed to expose such flat side in the storage tray member, which avoids contact with a baggage or article loaded on the rear side of seat back and prevents damage for both of the baggage and anchor engagement member.

19 Claims, 3 Drawing Sheets

ARRANGEMENT FOR ANCHORING A GUARD NET IN AUTOMOBILE

BACKGROUND OF INVENTION

1. Field of the Invention

The present invention relates to a partition or guard net used for partitioning the interior of an automobile into a front cabin and a rear cabin, and in particular to an arrangement for securing or anchoring the guard net in automobile.

2. Description of Prior Art

In most of light-van-type automobiles, a rear seat is so designed that its seat back is foldable forwardly onto its seat cushion to provide a part of load-carrying platform in the rearward half section of the automobile. As seen in FIG. 1, a partition or guard net (N) is widely used in such light van car to partition the interior of its cabin into a front cabin section (FC), where a driver sits on a front seat (FS), and a rear cabin section (RC), where a rear seat (RS) is in non-use folded state, with its seat back (SB) folded onto its seat cushion (SC), providing thus a load carrying area or the like therein. The guard net of this kind is normally of a retractable roll type as shown in FIGS., 1 and 2, for example, wherein a rolled webbing of guard net (N) is stored in a housing of retractor (100) and can be drawn out therefrom or pulled back therein. The hanging end (101) of the guard net (N) is secured via two hook pieces (101F)(101F) to a securing member (NB) fixed on the ceiling of a light van car (VA). When in no use, the retracted state of guard net (N) (as seen in FIG. 2) is kept raised to the ceiling of the light van car (VA).

In the past, the forwardly foldable seat back (SB) of rear seat (RS) in the van-type car (VA) has been provided, at the rear side thereof, with an anchor engagement member projected therefrom for releasably engaging an anchor member of the guard net (N), so that the retractor portion (100) can be lowered and anchored to the projected anchor engagement member on the rear side of the seat back (SB) folded onto the seat cushion (SC), to thereby put up the guard net (N) vertically in the car (VA), partitioning the interior of car into the front and rear cabin sections (FC)(RC).

However, such projected anchor engagement member of prior art guard net structure is exposed to easily contact baggages loaded on the rear side of rear-seat seat back, as a result of which, it is of a high likelihood that the anchor engagement member itself or the baggage(s) will be broken or torn, creating unexpected damages. Further, the exposed projection of the anchor enagement member impairs the aesthetic appearance of seat.

SUMMARY OF THE INVENTION

In view of the above-stated drawbacks, it is a primary purpose of the present invention to provide an arrangement for anchoring a net means (a partition or guard net) to a seat back folded onto the seat cushion in a foldable type of automotive seat, which avoids breads or tears of a baggage loaded on the folded seat back and improves aesthetic appearance of seat.

To achieve such purpose, in accordance with the present invention, the arrangement basically comprises:

a tray-like storage means embedded in the rear side of the seat back, the tray-like storage member having a storage space opened from that rear side of seat back; and a reversible anchor engagement means which is so rotatably provided for reversal in the storage space of the tray-like storage means as to present a selected one of an enagement side with which an anchor member of the net means is to be engaged and a flat side generally flush with the rear side of seat back.

Accordingly, when in no use, the reversible anchor engagement means does not project from the flat upper surface of seat back rear side, thus avoiding contact with a baggage or article loaded thereon, and also improves the aesthetic appearance of seat.

As one aspect of the invention, the reversible anchor engagement means is so arranged as to be rotatable about an axis extending through a central line thereof for reversal relative to such axis, thereby permitting for selectively exposing one of the engagement and flat sides in the storage space of tray-like storage means.

As another aspect of the invention, the reversible anchor engagement is so arranged as to be rotatable about an axis extending through a lateral side thereof, such as to be selectively reversed relative to such axis in one of a use direction to expose the engagement side in the tray-like storage means and a non-use direction to expose the flat side in the same storage means.

It is a second purpose of the present invention to simplify the structure and assembling of the anchor engagement means and tray-like storage means.

For that purpose, in the case of the foregoing one aspect, the tray-like storage means may be formed with a air of bearing holes coaxially aligned with each other along a longitudinal direction of the axis extending through the central line of the tray-like storage means, and the reversible anchor engagement means may be provided with a pair of support pins, each being so biased by a spring means as to project away from each other, while being permitted to be depressed toward each other. Accordingly, the reversible anchor engagement means can easily be rotatably supported in the tray-like storage means, simply by depressing the support pins and releasing them from the depressed state to project through the respective two bearing holes of tray-like storage means. On the other hand, in the case of the foregoing another aspect, the reversible anchor engagement means may be formed integrally with a flat securing means which continuously projects therefrom in registry therewith, the flat securing means being to be secured in the storage space of said tray-like storage means. A thin elastic boundary line is formed between the reversible anchor engagement means and flat securing means, extending along the axis extending through the lateral side of the reversible anchor engagement means. Accordingly, the reversible anchor engagement means may easily be secured in the storage space of tray-like storage means through the flat securing means. Preferably, the flat securing means may comprise a flat plate member and a plurality of securing pawls, while the storage space of tray-like storage means be provided with a plurality of securing holes in which the plural securing pawls is to be snap fitted.

Other various features and advantages of the present invention will be become apparent from reading of the descriptions hereinafter, with reference to the annexed drawings.

DETAILED DESCRIPTION OF PREFERRED EMBODIMENTS OF THE INVENTION

Figure 1:
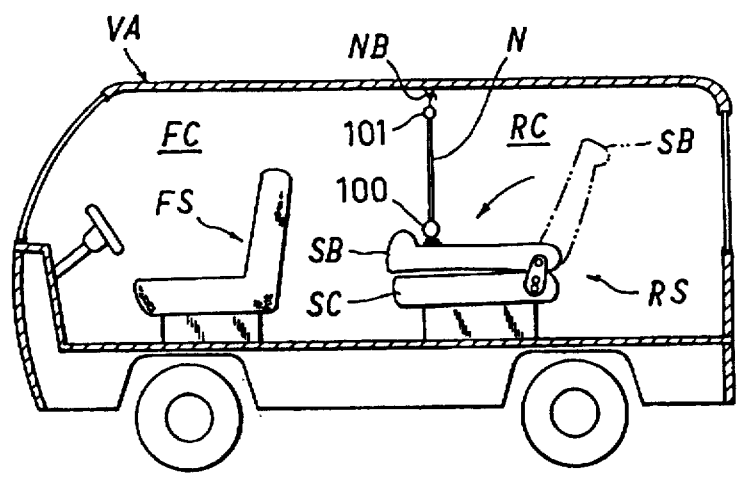
FIG. 1 is a schematic sectional view of a light-van-type automobile to which the present invention is applied.
Figure 2:
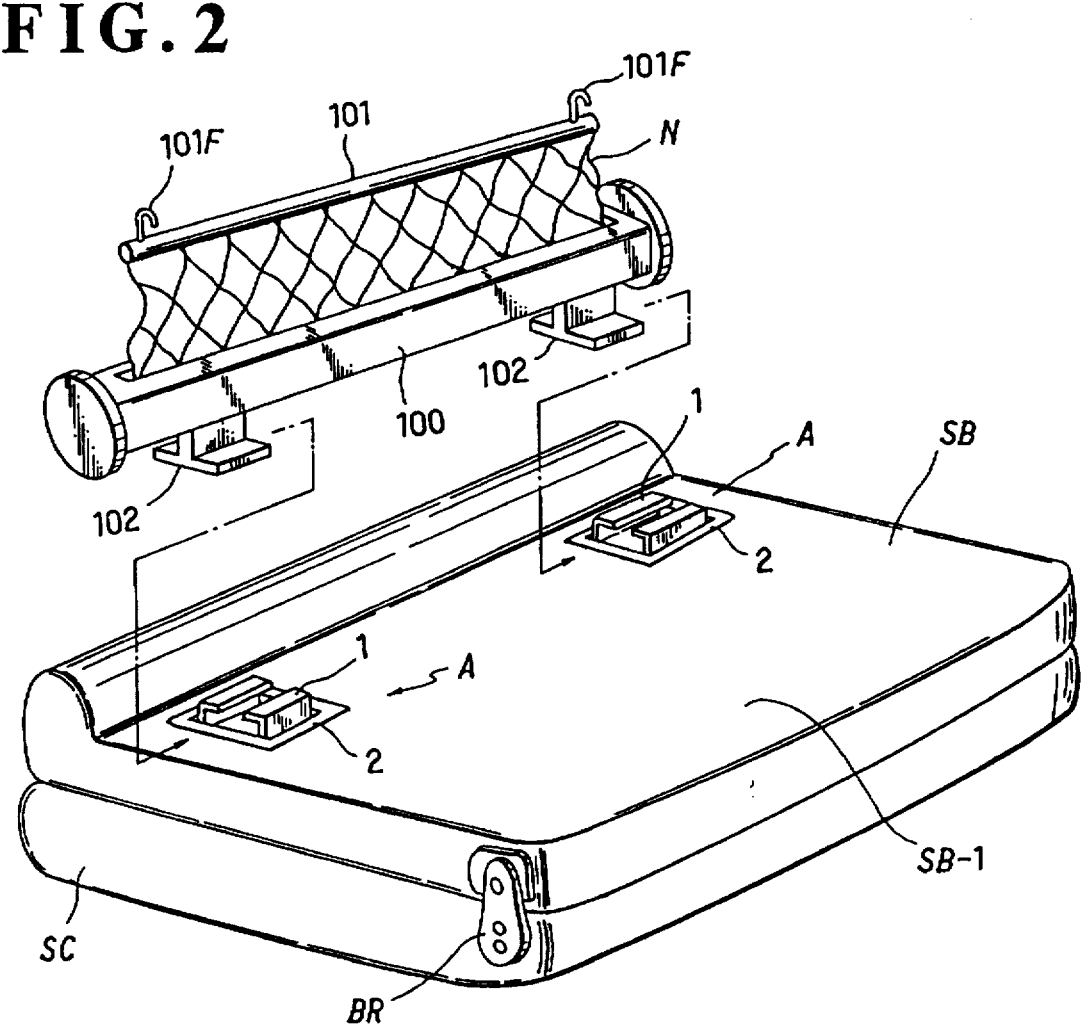
FIG. 2 is a schematic perspective view showing one mode of a net anchoring arrangement in the present invention.

In accordance with the present invention, there is employed the same net means comprising a rolled webbing type of partition or guard net (N) and a retractor (100) which has been elaborated in the previous description of prior art with reference to FIGS. 1 and 2. Thus, further explanation is deleted on such known guard net structure, and all like designations to be used hereinafter correspond to all like designations given in the description prior art.

Referring now to FIGS. 2 through 8, there are illustrated two embodiments showing in common a reversible anchor engagement means and an anchor means engageable therewith, which are contemplated in the present invention to avoid the above-discussed objectionable projection of anchor engaging member to be engaged with an anchor of the guard net (N). One exemplary mode thereof is shown in FIGS. 2 to 5, and another exemplary mode thereof shown in FIGS. 3 to 5. Thus, those embodiments are alternative species to be covered by the generic definition of annexed claims and not limitative particularly. It is therefore possible within the gist of the present invention to modify the illustrated anchor engagement unit (A or A') and anchor members (102) to be described hereinafter, in any other alternative modes.

With first reference to FIGS. 2 to 5, one mode of the reversible anchor engagement means is shown, which is embodied by a pair of spaced-part reversible anchor engagement units (A)(A) arranged on the flat rear side (SB-1) of seat back (SB) associated with the forwardly foldable type of rear seat (RS). The two anchor engagement units (A)(A) are spaced part from and abreast of each other on a line at the upper area of the seat back (SB), along which a seat back frame (30) extends within the seat back (SB).

With regard to the partition or guard net (N), in accordance with the present invention, its associated retractor (100) has a pair of spaced-apart integral anchor members (102)(102), each having a generally T-shaped cross-section adapted for slidable engagement in the respective two reversible anchor engagement units (A)(A) mentioned above.

Each of the paired reversible anchor units (A)(A) is comprised of: a reversible anchor engagement member (1) which is rotatable about an axis of two biasingly projected support pins (10)(10) to permit 180-degree reversal of the anchor engagement member body to select one of its working engagement side (1B, 1C) and non-use flat side (1A) as will be described later; and a storage tray member (or a so-called garnish box) (2) in which the anchor engagement member (1) is rotatably journalled via those two support pins (10)(10) thereof.

Specifically, the reversible anchor engagement member (1) is formed from a hard synthetic resin material (e.g. polypropylene) generally in the illustrated channel configuration having a horizontal or flat main section (1A) and a pair of oppositedly faced L-shaped lateral side sections (1B) (1B) each extending at a right angle from the main section (1A). As shown, an engagement spacing (1H) is defined among the main section (1A) and two lateral sections (1B)(1B), and an engagement groove (1P) defined between the two horizontally extending flange parts (1C)(1C) respectively of those two lateral sections (1B)(1B), whereupon those engagement spacing and groove (1H)(1P) provide a female engagement portion into which the T-shaped male anchor member (102) is to be slidingly engaged. Hence, the anchor enagement member (1) per se may be reversed such that the outer planar surface of main section (1A) thereof presents a flat non-working side with respect to the anchor member (102) of guard net (N), or alternatively the two L-shaped sections (1B)(1B) thereof present a working engagement side with respect to that anchor member (102).

Figure 5:
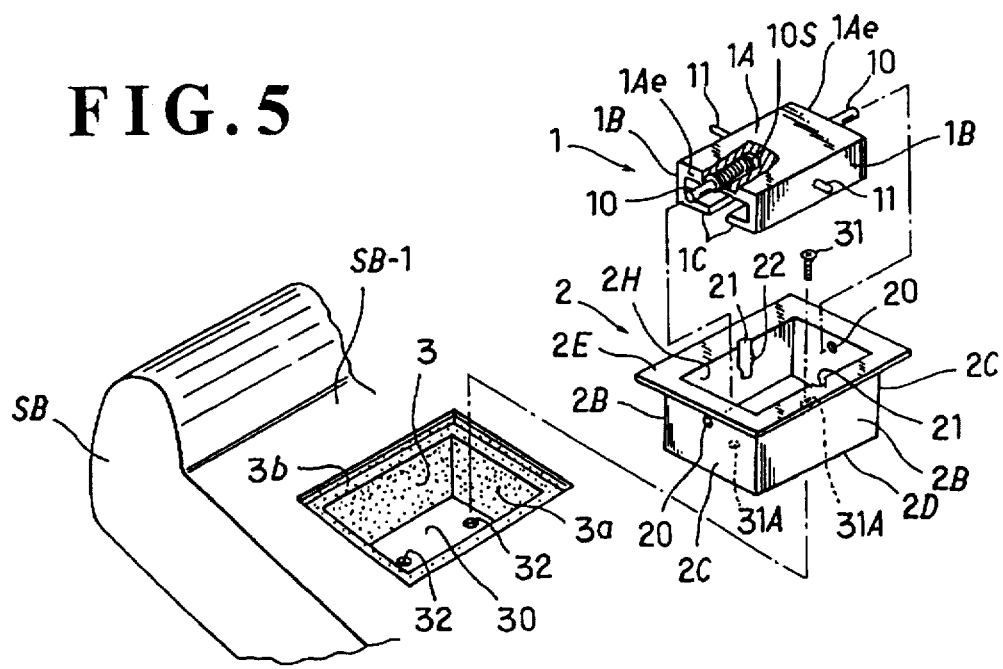
FIG. 5 is a partly broken schematic perspective view of the one mode of the present invention.

As best shown in FIG. 5, a pair of biasingly projected support pins (10)(10) are provided in the respective forward and backward side portions of main section (1A) of anchor engagement member (1), while on the other hand, a pair of elastic stopper pins (11)(11) are formed integrally in the respective two lateral side sections (1B)(1B) of same anchor engagement member (1). Each support pin (10) is provided movably within the main section (1A) and so biased by a spring (10S) as to resiliently project outwards from the edge wall (1Ae) of main section (1A), and each stopper pin (11) should preferably be given an elastic property, using the same synthetic resin material of the anchor engagement member (1). In the present mode, the two support pins (10)(10) can be depressed and projected toward and away from each other along the length-wise direction of the anchor engagement member (1), whereas the two stopper pins (11)(11) project away from each other along the width-wise direction of the anchor engagement member (1).

Each T-shaped anchor member (102) of the guard net (N) is to be slidably inserted into the foregoing engagement spacing and groove (1H)(1P) of anchor engagement member (1) from one side, as indicated in FIG. 2.

The storage tray member (2), as viewed from FIG. 5, is formed from a hard synthetic resin material (e.g. polypropylene) in a genearlly parallelepiped shape, comprising a rectangular upper flange portion (2E) and a lower recessed storage space (2H) defined by a pair of forward and backward walls (2C)(2C), a pair of lateral walls (2B)(2B) and a bottom wall (2D), wherein those all walls (2B, 2C, 2D) are integral with the flange portion (2E) as shown. Formed midway in the respective inward surfaces of the two lateral walls (2B)(2B) is each of two vertically extending guide grooves (21)(21), along which each stopper pin portion (11) of anchor engagement member (1) is to pass elastically and slidingly. Each guide groove (21) includes a circular stopper groove (22) formed midway therein, in which stopper groove (22), the stopper pin (11) of anchor engagement member (1) is to be locked temporarily. It is therefore important that each guide groove (21) be formed slightly narrow relative to the corresponding stopper groove (22), so that each stopper pin (11) may be slightly collapsed and slid in the narrow guide groove (21) and recovered elastically into its original cylindrical shape within the stopper groove (22), whereby the stopper pin (11) may be locked and retained in the stopper groove (22). Further, formed midway in the respective upper areas of forward and backward walls (2C)(2C) of tray member (2) is each of two bearing holes (20)(20) in which each support pin (10) of anchor engagement member (1) is to be rotatably supported.

Figure 4:
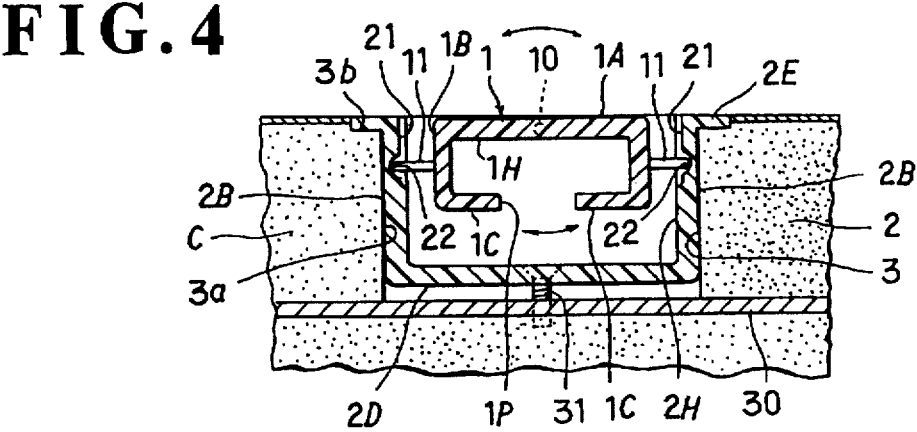
FIG. 4 is a cross-sectional view of the same one mode of the present invention, showing the reversible anchor engagement member to be secured in the storage tray member.

The recessed storage space (2H) is so dimensioned to accommodate the anchor enagement member (1) therein, allowing the same (1) to be bodily revolved about an axis extending through the two bearing holes (20)(20) as indicated by the arrows in FIG. 4.

Designations (31A)(31A) denote a pair of screw holes perforated in the bottom wall (2D) of tray member (2). Through each screw hole (31A), a securing screw (31) is inserted for firmly securing the tray member (2) in the recessed opening (3) of seat back (SB).

With the above-described arrangement, the anchor engagement member (1) is secured in the storage space (2H) of tray member (2) through the steps of: (i) depressing both support pins (10)(10) against the biasing forces of springs (10S)(10S), (ii) inserting both stopper pins (11)(11) in and along therespective two guide grooves (21)(21), and retaining them in the respective two stopper grooves (22)(22), and (iii) releasing both support pins (10)(10) from the depressed state to allow them to project and pass through those two holes (22)(22), respectively, as can be seen from FIGS. 3, 4 and 5. In that way, a reversible anchor engagement unit (A) is assembled, in which the anchor engagement member (1) is rotatable about an axis of both support pins (10)(10) for 180-degree reversal to expose selected one of the working engagement side (1B, 1C, 1H, 1P) and non-working flat side (1A) from within the storage tray member (2). Also, with such 180-degree reversal of anchor engagement member (1), the two associated stopper pins (11)(11) are moved around relative to the axis of support pins (10)(10), while being slid past through the respective two guide grooves (21) and stopper grooves (22) of tray member (2), and again locked in the respective stopper grooves (22) through the respective guide grooves (21), so that the body of anchor engagement member (1) is retained either in the use state where the working engagement side (1B, 1C, 1H, 1P) shows up, or in the non-use state where the non-working flat side (1A) shows up, from the recessed space (2H) of tray member (2).

Figure 3:
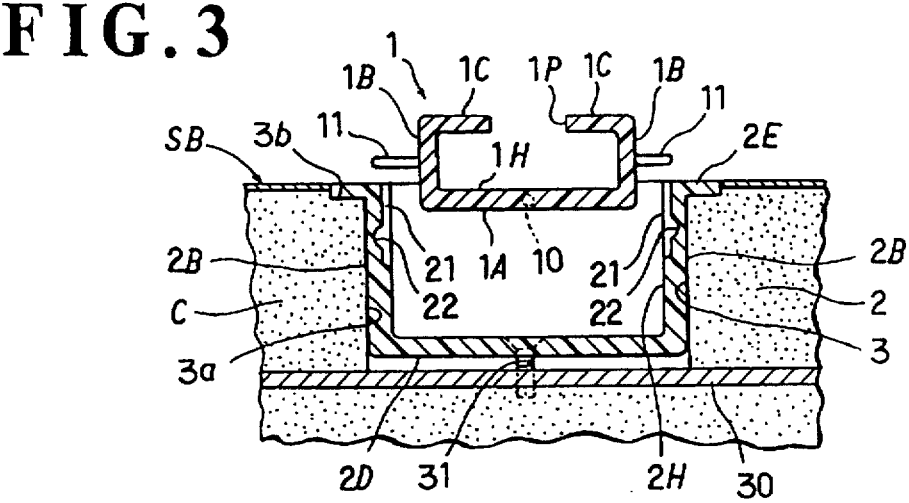
FIG. 3 is a cross-sectional view of the one mode of net anchoring arrangement, showing a reversible anchor engagement member to be removed from a storage tray member.

As can be seen from FIG. 5 in conjunction with FIG. 2, a pair of spaced-apart recessed securing areas (3) are formed in the upper area of seat back rear side (SB-1), by hollowing out two corresponding areas of cushion member (C), such as to expose two local parts of the seat back frame (30) therefrom, providing thus two securing points at which the above-constructed two reversible anchor engagement units (A)(A) are respectively secured. In each of exposed local parts of seat back frame (30), two threaded holes (32)(32) are formed, into which two securing screws (31) are to be driven for securing the storage tray member (2) in the recessed securing area (3). Namely, as indicated in FIG. 5, each storage tray member (2), before being assembled with the anchor engagement member (1), is fitted in the corresponding recessed area (3) such that the body (2B, 2C, 2D) and flange (2E) thereof are respectively received in the deep central recessed region (3a) and shallow peripheral recessed region (3b) of the securing area (3), as best seen in FIGS. 3 and 4, and then, the bottom wall (2D) of each tray member (2) is firmly secured to the corresponding exposed part of seat back frame (30) by passing a securing screw (31) through each hole (31A) of tray member (2) and driving it in each threaded hole (32) of seat back frame (30). Therefore, the tray member (2) is secured in the seat back (SB), with the upper surface of flange (2E) thereof in registry with the upper surface of seat back rear side (SB-1). Then, the anchor engagement member (1) is attached in the thus-fixed tray member (2) through the steps stated above. Accordingly, when in use, the anchor engagement member (1) can be reversed to expose the working enagement side (1B, 1C, 1H, 1P) in the tray member (2) and retained therein by virtue of the two stopper pins (11)(11) being locked in the respective two stopper grooves (21)(21). In this case, each anchor member (102) of guard net (N) may be engaged in the thus-exposed working engagement side, i.e. the enagement spacing and groove (2H)(2P), respectively of the two anchor engagement units (A)(A). On the contrary, when not in use, the anchor engagement member (1) can be reversed to expose the non-working flat side (1A) in the tray member (2) and retained therein by the same locking action of two stopper pins (11)(11) in the respective two stopper grooves (21)(21), whereby a flat surface is established in each of the two anchor engagement units (A)(A), generally flush with the upper flat surface of seat back rear side (SB-1), thus avoiding contact with a baggage or article loaded on that seat back rear side (SB-1) and preventing damage for both of the anchor enagement units (A)(A) themselves and the baggage loaded thereupon. In addition, the non-use flat state of anchor engagement member (1) improves the aesthetic appearance of back seat (SB).

Figure 6:
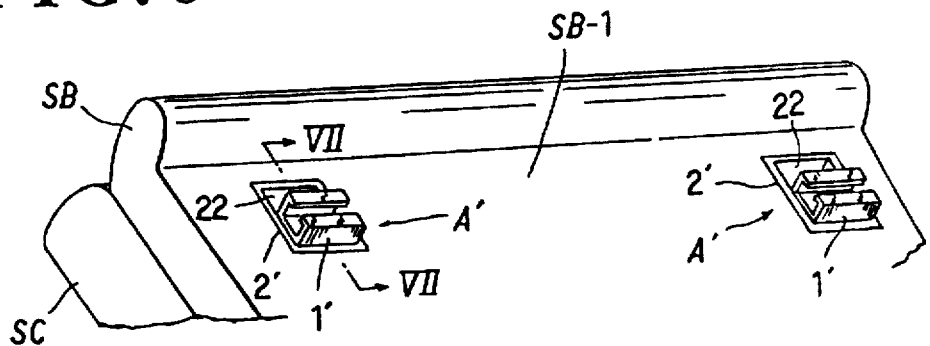
FIG. 6 is a partly broken schematic perspective view of other mode of the present invention.
Figure 7:
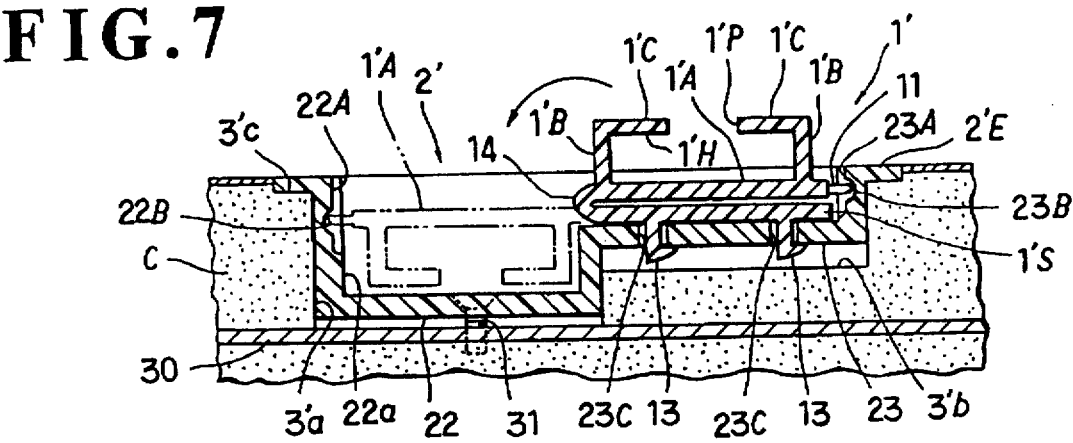
FIG. 7 is a sectional view taken along the line VII—VII in FIG. 6.
Figure 8:
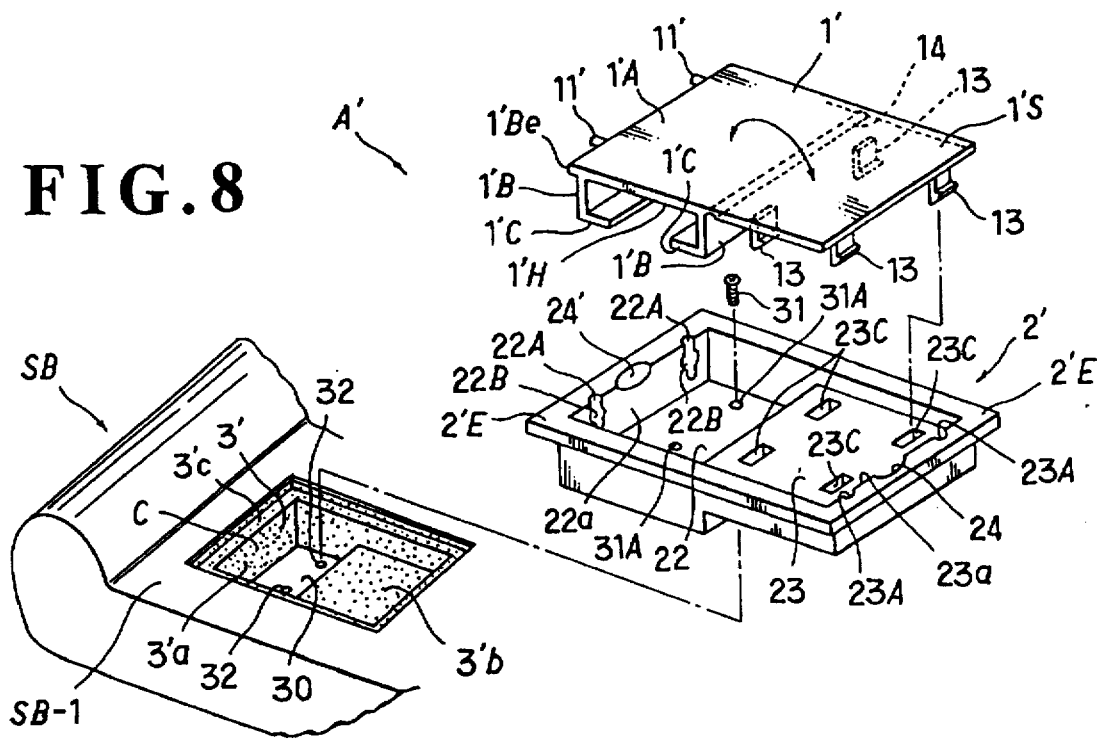
FIG. 8 is a partly broken schematic perspective view of such other mode of the present invention.

Reference is now made to FIGS. 6 to 8, wherein another alternative mode of the reversible anchor engagement means is shown, which is embodied by a pair of spaced-part reversible anchor engagement units (A')(A') arranged on the flat rear side (SB-1) of seat back (SB). Similar to the foregoing first mode, those another two anchor engagement units (A')(A') are disposed abreast of each other on a line at the upper area of the seat back (SB), along which the seat back frame (30) extends within the seat back (SB).

According to each of the anchor engagement units (A') (A') of this particular mode, there is utilized a reversible anchor engagement member (1') generally identical in shape to the one (1) of foregoing first mode, except that the body of anchor engagement member (1') is formed integrally with a securing plate member (1'S) at one lateral side thereof and rotatable about a thin elastic boundary line (14) defined between the anchor engagement member (1') and securing plate member (1'S). Otherwise stated, the anchor engagement member (1') is rotatable about the boundary line (14), permitting its 180-degree reversal to select one of the working engagement side (1'B, 1'C, 1'H, 1'P) and non-working flat side (1'A) as will be elaborated later.

Specifically, each reversible anchor engagement unit (A') comprises the body of anchor engagement member (1') with the integral securing plate member (1'S) and a storage tray member (2') in which those anchor engagement member (1') and securing plate member (1'S) are secured. As similar to the foregoing first mode, the anchor engagement member (1') is formed from a hard synthetic resin material (e.g. polypropylene) generally in a channel configuration having a horizontal or flat main section (1'A) and a pair of opposedly faced L-shaped lateral side sections (1'B)(1'B) each extending at a right angle from the main section (1'A), with an engagement spacing (1'H) defined among the main section (1'A) and two lateral sections (1'B)(1'B) and with an engagement groove (1'P) defined between the two horizontally extending flange parts (1'C)(1'C) respectively of those two lateral sections (1'B)(1'B). The engagement spacing and groove (1H)(1P) provide a female engagement portion into which the T-shaped male anchor member (102) is to be slidingly engaged. The anchor engagement member (1') further includes a flat flange portion (1'Be) which extends continuously from one lateral side of the main section (1'A) thereof and a pair of spaced-apart elastic stopper pins (11')(11') formed integrally in the extremity of the flange portion (1'Be). The securing plate member (1'S) is formed as an integral flat extension from another lateral side of the main section (1'A) of anchor engagement member (1'). It is noted here that the width of securing plate member (1'S) is equal to that of both main section (1'A) and flange portion (1'Be) as can be seen in FIG. 7. The securing plate (1'S) is formed with four hook-like securing pawls (13) at the reverse side thereof. A thin elastic boundary line (14) is defined between the main section (1'A) and securing plate member (1'S) to permit the anchor engagement member (1') per se to be rotatable and foldable about an axis of that boundary line (14) onto and away from the upper flat surface of securing plate member (1'S). Thus, the anchor engagement member body (1') can be reversed by 180 degrees in relation to the axis of boundary line (14), as indicated by the arrow in FIG. 8, so as to select one of the working engagement side (1'B, 1'C, 1'H, 1'P) and non-working flat side (1'A).

The storage tray member (2') in this particular mode, is modified from the storage tray member (2) of the first mode by forming a shallow recessed area (23) therewith, such as to receive and store both foregoing anchor engagement member (1') and securing plate member (1'S) therein. Thus, the tray member (2') is so formed to have an upper flange portion (2'E), a deep recessed area (22) and a shallow recessed area (23). The deep recessed area (22) is so dimensioned to store the anchor enagement member (1), allowing entry and exit of the same thereinto and therefrom, as indicated in FIG. 7. As likewise in the first mode, this deep recessed area (22) has a pair of screw holes (31A)(31A) perforated in the bottom side thereof and a pair of vertically extending guide grooves (22A)(22A) formed in one lateral side (22a) thereof, wherein a circular stopper groove (22B) is formed midway in each of those two guide grooves (22A)(22A). On the other hand, the shallow recessed area (23) is so dimensioned that juxtaposed layers of the anchor engagement member main section (1'A) and securing plate member (1'S) are accommodated therein, as understandable from FIG. 7. This shallow recessed area (23) has four securing holes (23C) perforated in the bottom side thereof and a pair of vertically extending guide grooves (23A)(23A) formed in one lateral side (23a) thereof. Designations (24) (24) denote a pair of opposedly facing cut-away portions which are each formed midway in the respective two lateral sides of tray member (2), as shown in FIG. 8, with a view to allowing entry of a user's fingertip through each of the cut-away portions (24) to easily pick up the flange portion (1'Be) of anchor engagement member (1') as will be described later.

With this arrangement, the anchor engagement member (1') is easily secured in the storage tray member (2') by snap fitting the four securing pawls (13) of securing plate member (1'S) in the respective four securing holes (23C) so that the securing plate member (1'S) is securely received in the shallow recessed area (23) of storage tray member (2'). Accordingly, the anchor engagement member (1') may be selectively reversed relative to the boundary line (14) in one of a use direction wherein its working engagement side (1'B, 1'C, 1'H, 1'P) is shown up in the shallow recessed area (23) of tray member (2') and a non-use direction wherein its non-working flat side (1'A) is shown up in the deep recessed area (22) of tray member (2').

Also, likewise in the first mode, as can be seen from FIG. 8 in conjunction with FIG. 6, a pair of spaced-apart recessed securing areas (3') are formed in the upper area of back side (SB-1) of the same seat back (SB) as used in the first mode. Thus, further explanation on the seat back (SB) is deleted for the sake of simplicity in description. In each of those particular recessed areas (3'), a deep recessed region (3'a), a shallow recessed region (3'b) and a rectangular peripheral shallow recessed region (3'c) are formed by hollowing out the corresponding area of cushion member (C) accordingly, such as to expose a local part of seat frame (32) from the deep recessed region (3'a). In the exposed local part of seat frame (32), two threaded holes (32)(32) are formed. Of course, those recessed regions (3'a)(3'b)(3'c) are formed generally in conformity with the respective outer configurations of deep recessed area (22), shallow recessed area (23) and flange portion (2'E) of tray member (2').

As indicated in FIG. 8, each storage tray member (2') may be fitted in the corresponding recessed securing area (3'), such that the deep recessed area (22), shallow recessed area (23) and flange portion (2'E) of the former (2') are respectively received in the deep recessed region (3'a), shallow recessed region (3'b) and peripheral recessed region (3'c) of the latter (3') (see FIG. 7), and then, the bottom side of deep recessed area (22) of tray member (2') is firmly secured to the corresponding exposed part of seat back frame (30) by passing a securing screw (31) through each hole (31A) of tray member (2') and driving it in each threaded hole (32) of seat back frame (30). Therefore, the tray member (2') is secured in the seat back (SB), with the upper surface of flange (2'E) thereof in registry with the upper surface of seat back rear side (SB-1). Then, the anchor engagement member (1) is attached in the thus-fixed tray member (2) by way of snap fitting the four pawls (13) of securing plate member (1'S) into the four securing holes (23C), respectively.

Accordingly, when in use, the anchor engagement member (1') can be reversed and folded relative to the boundary line (14), with its flat surface side (1'A) being brought in contact upon the flat surface of securing plate member (1'S), to thereby expose the working enagement side (1'B, 1'C, 1'H, 1'P) in the tray member (2') and retained therein by virtue of the two stopper pins (11')(11') being locked in the respective two stopper grooves (22B)(22B), as seen in FIG. 7. In this case, each anchor member (102) of guard net (N) may be engaged in the thus-exposed working engagement side, i.e. the enagement spacing and groove (1'H)(1'P) respectively of the two anchor engagement units (A')(A'). On the contrary, when not in use, a user may insert his or her fingertip into between the cut-away portion (24) of tray member (2') and the flange portion (1'Be) of anchor engagement member (1'), and pull up and turn over the body of anchor engagement member (1'), overcoming the frictional force of stopper pin (11') in the narrow guide groove (22A), in a direction toward the deep recessed area (22) of tray member (2'), so that the anchor engagement member (1') is reversed to show up its non-working side (1'A) in the deep recessed area (22) of tray member (2') as indicated by the two dot-chain line in FIG. 7, and retained therein due to the two stopper pins (11')(11') being locked in the respective another two stopper grooves (22B)(22B). Thus, the non-working flat side (1'A) of anchor engagement member (1') is retained on the same plane with the outer flat surface of securing plate member (1'S), whereupon a flat surface is established in each of the two anchor engagement units (A')(A'), generally flush with the upper flat surface of seat back rear side (SB-1), thus avoiding contact with a baggage or article loaded on that seat back rear side (SB-1) and preventing damage for both of the anchor enagement units (A')(A') themselves and the baggage loaded thereupon. In addition, the non-use flat state of anchor engagement member (1') improves the aesthetic appearance of seat back (SB).

While having described the present invention thus far, it should be understood that the invention is not limited to the illustrated embodiments, as stated earlier, and any other modifications, replacements and additions may be structurally applied thereto without departing from the scopes of the appended claims.

What is claimed is:

1. An arrangement for anchoring a net means to a foldable type of automotive seat, in which the automotive seat has a seat cushion and a seat back foldable onto the seat cushion and the net means may be drawn downwards from a ceiling of an automobile and anchored, via an anchor member thereof, to a rear side of the seat back folded onto the seat cushion so as to partition an interior of the automobile into a front cabin section and a rear cabin section, with the rear side of the seat back serving as a load-carrying platform in the rear cabin section, said arrangement comprising:

a tray-like storage means embedded in said rear side of said seat back, said tray-like storage member having a storage space opened from said rear side of said seat back; and a reversible anchor engagement means which is rotatably provided for permitting its reversal in said storage space of said tray-like storage means such as to present a selected one of an enagement side and a flat side, wherein said anchor member of said net means is to be engaged with said engagement side to anchor said net means to said rear side of said seat back, and wherein said flat side provides a flat plane generally flush with said rear side of said seat back.

2. The arrangement as defined in claim 1, wherein said said net means comprises a retractor and a partition or guard net stored in said retractor, wherein said anchor member is formed at said retractor, and wherein said guard net is connected at one free end thereof to said ceiling of said automobile and can be drawn downwards by lowering said retractor toward said reversible anchor engagement means so that said anchor member may be engaged with said engagement side of said reversible anchor engagement means to anchor said net means to said rear side of said seat back.

3. The arrangement as defined in claim 2, wherein said anchor member is of a generally T-shaped cross-section, and wherein said engagement side is formed generally in a channel cross-section allowing said generally T-shaped cross-section of said engagement member to be slidingly engaged thereinto.

4. The arrangement as defined in claim 1, wherein said reversible anchor engagement means is formed such that said engagement side is defined on one side thereof and said flat side is defined on another reverse side thereof, and wherein said reversible anchor engagement means per se is rotatable about an axis extending through a central line thereof and thus may be reversed relative to said axis, to thereby selectively expose one of said engagement and flat sides in said storage space of said tray-like storage means.

5. The arrangement as defined in claim 4, wherein said tray-like storage means includes a pair of bearing holes coaxially aligned with each other along a longitudinal direction of said axis and said reversible anchor engagement means includes a pair of support pins, each being rotatably supported in the respective said pair of bearing holes of said tray-like storage means.

6. The arrangement according to claim 5, wherein said pair of support pins are so biased by a spring means as to project away from each other in an outward direction from said reversible anchor engagement means, while being permitted to be depressed towards each other into within said reversible anchor engagement means.

7. The arrangement as defined in claim 1, wherein said reversible anchor engagement means is formed such that said engagement side is defined on one side thereof and said flat side is defined on another reverse side thereof, and wherein said reversible anchor engagement means per se is so rotatable about an axis extending along one lateral side thereof and thus may be selectively reversed relative to said axis in one of a use direction to expose said engagement side in said tray-like storage means and a non-use direction to expose said flat side in said same tray-like storage means.

8. The arrangement as defined in claim 7, wherein said storage space of said tray-like storage means is so formed to have a deep recessed area and a shallow recessed area, and said axis extends along a line between said deep and shallow recessed areas, so that said anchor engagement means may be selectively reversed relative to said axis in one of a use direction to expose said engagement side in said shallow recessed area of said tray-like storage means and a non-use direction to expose said flat side in said deep recessed area of said tray-like storage means.

9. The arrangement as defined in claim 4, wherein said tray-like storage means includes a pair of bearing holes coaxially aligned with each other along a longitudinal direction of said axis, and further includes at least two groove means facing toward each other along a line intersecting said longitudinal direction of said axis, and wherein said reversible anchor engagement means includes a pair of support pins, each being rotatably supported in the respective said pair of bearing holes of said tray-like storage means, and further includes at least two stopper pins which are releasably secured in said at least two groove means, respectively, so that said reversible anchor engagement means may be rotated and reversed about said axis via said pair of support pins and retained due to said at least two stopper pin being secured in said at least two groove means, respectively, so as to selectively expose and retain one of said engagement and flat sides in said storage space of said tray-like storage means.

10. The arrangement as defined in claim 9, wherein said reversible anchor engagement means is formed from a hard synthetic resin material and said at least two stopper pins are each formed integrally to said reversible anchor engagement means, using a synthetic resin material of an elastic property.

11. The arrangement as defined in claim 9, wherein said at least two groove means each comprises a vertically extending guide groove and a generally circular stopper groove defined midway in said vertically extending guide groove, so that each of said at least two stopper pins are elastically slid along said vertically extending guide groove and retained in said generally circular stopper groove.

12. The arrangement as defined in claim 7, wherein said reversible anchor engagement means is integrally formed with a flat securing means which continuously extends from said flat side of said reversible anchor engagement means in registry therewith, said flat securing means being secured in said storage space of said tray-like storage means, wherein a thin elastic boundary line is formed between said flat securing means and said flat side of said reversible anchor engagement means, wherein said axis extends along said thin elastic boundary line, so that said reversible anchor means may be selectively reversed relative to said thin elastic boundary line in one of a use direction to expose said engagement side, with said flat side thereof being brought in contact upon said flat securing means secured in said storage space of said tray-like storage means, and a non-use direction to expose said flat side, with said flat side being generally flush with said flat securing means, presenting thus a flat surface in said storage space of said tray-like storage means.

13. The arrangement as defined in claim 12, wherein said storage space of said tray-like storage means is so formed to have, defined therein, one recessed area and another recessed area, and wherein said flat securing means is to be secured on said one recessed area, so that said reversible anchor means may be selectively reversed relative to said thin elastic boundary line in one of a use direction to expose said engagement side upon said one recessed area, with said flat side thereof being brought in contact upon said flat securing means secured on said same one recessed area, and a non-use direction to expose said flat side in said another recessed area, with said flat side being generally flush with said flat securing means, presenting thus a flat surface in said storage space of said tray-like storage means.

14. The arrangement as defined in claim 12, wherein said one recessed area is formed shallow relative to said another recessed area.

15. The arrangement as defined in claim 12, wherein said flat securing means comprises: a securing plate member having one flat side which is normally flush with said flat side of said reversible anchor engagement means; and a plurality of securing pawls formed in another side of said securing plate member, and wherein said storage space of said tray-like storage means is provided with a plurality of securing holes in which said plurality of securing pawls of said securing plate member are secured respectively.

16. The arrangement as defined in claim 13, wherein said flat securing means comprises: a securing plate member having one flat side which is normally flush with said flat side of said reversible anchor engagement means; and a plurality of securing pawls formed in another side of said securing plate member, and wherein said one recessed area of said tray-like storage means is provided with a plurality of securing holes in which of said plurality of securing pawls of said securing plate member are secured respectively.

17. The arrangement as defined in claim 13, wherein said anchor engagement means further includes at least one stopper pin formed at one free end thereof, wherein said storage space of said tray-like storage means further includes at least a pair of oppositely facing groove means, each being formed in the respective said one and another recessed areas of said tray-like storage means, so that said reversible anchor means may be selectively reversed relative to said axis in one of said use and non-use directions, and retained in one of said one and another recessed areas of said tray-like storage means due to said at least one stopper pin being secured in one of said at least two groove means, so as to selectively expose and retain one of said engagement and flat sides in said storage space of said tray-like storage means.

18. The arrangement as defined in claim 16, wherein said reversible anchor engagement means is formed from a hard synthetic resin material and said at least one stopper pin is formed integrally to said reversible anchor engagement means, using a synthetic resin material of an elastic property.

19. The arrangement as defined in claim 16, wherein said at least one pair of groove means each comprises a vertically extending guide groove and a generally circular stopper groove defined midway in said vertically extending guide groove, so that said at least one stopper pin is elastically slid along said vertically extending guide groove and retained in said generally circular stopper groove.

* * * * *